United States Patent

[11] 3,587,325

| [72] | Inventors | Lee Hunter<br>St. Louis;<br>David A. Senften, Florissant, Mo. |
|---|---|---|
| [21] | Appl. No. | 814,059 |
| [22] | Filed | April 7, 1969 |
| [45] | Patented | June 28, 1971 |
| [73] | Assignee | Hunter Engineering Company,<br>Bridgeton, Mo. |

[54] CONTROL FOR DYNAMIC WHEEL ALIGNNMENT APPARATUS
9 Claims, 6 Drawing Figs.

[52] U.S. Cl. .................................................. 73/462,
73/471, 33/203.13
[51] Int. Cl. .................................................. G01m 1/22
[50] Field of Search .......................................... 73/66, 460,
462, 471—479, 487, 71.2, 71.4; 318/128;
33/203.12, 203.13

[56] References Cited
UNITED STATES PATENTS

| 2,796,600 | 6/1957 | Church | 73/462 |
| 2,986,920 | 6/1961 | Fibikar | 73/462 |
| 3,095,532 | 6/1963 | Floyd | 73/71.4 |
| 3,394,581 | 7/1968 | Johnson | 73/71.2 |
| 3,463,984 | 8/1969 | Ross et al. | 318/127 |

*Primary Examiner*—James J. Gill
*Assistant Examiner*—Herbert Goldstein
*Attorney*—Gravely, Lieder and Woodruff

ABSTRACT: Control means in the nature of a brake which can be applied or activated in response to unstable motion of dynamic vehicle wheel alignment apparatus. The control means is constantly vigilant in monitoring the motion of such apparatus so that a vehicle which is greatly out of alignment is prevented from causing the dynamic apparatus to vibrate or gyrate in an unstable and dangerous manner.

CONTROL FOR DYNAMIC WHEEL ALIGNNMENT APPARATUS

BRIEF DESCRIPTION OF THE INVENTION

This invention relates to means for controlling the response characteristics of dynamic wheel alignment apparatus, and is particularly concerned with means to brake and slow down excessive gyrations or unstable motions of a character that could damage the apparatus.

Dynamic wheel alignment apparatus of the character disclosed in the patent of M. S. Merrill, et al. U.S. Pat. No. 3,187,440, issued June 8, 1965, as well as the apparatus disclosed in the application of Lee Hunter et al., Ser. No. 811,160 filed Mar. 27, 1969, can be subjected to damaging forces if a vehicle is placed thereon that is greatly out of proper alignment. Misaligned wheels when rotated at road speeds on the supporting rollers of the subject apparatus can cause the apparatus to become unstable and shake. If the vibration and shaking, and attendant gyrations are not checked the vehicle could be vibrated off the apparatus.

The objects of this invention are to prevent the dynamic wheel alignment apparatus from reaching a state where a vehicle being tested can damage the apparatus due to excessive alignment faults, and to accomplish the control over such apparatus with simple means that will restrain, check or brake shaking and vibration before it can become dangerous.

BRIEF DESCRIPTION OF THE DRAWINGS

The present invention is shown, in a presently preferred embodiment, in the several views of the accompanying drawings, wherein:

FIG. 4 is a detailed view taken at line 4–4 in FIG. 3;

DESCRIPTION OF THE APPARATUS

Figure 1:
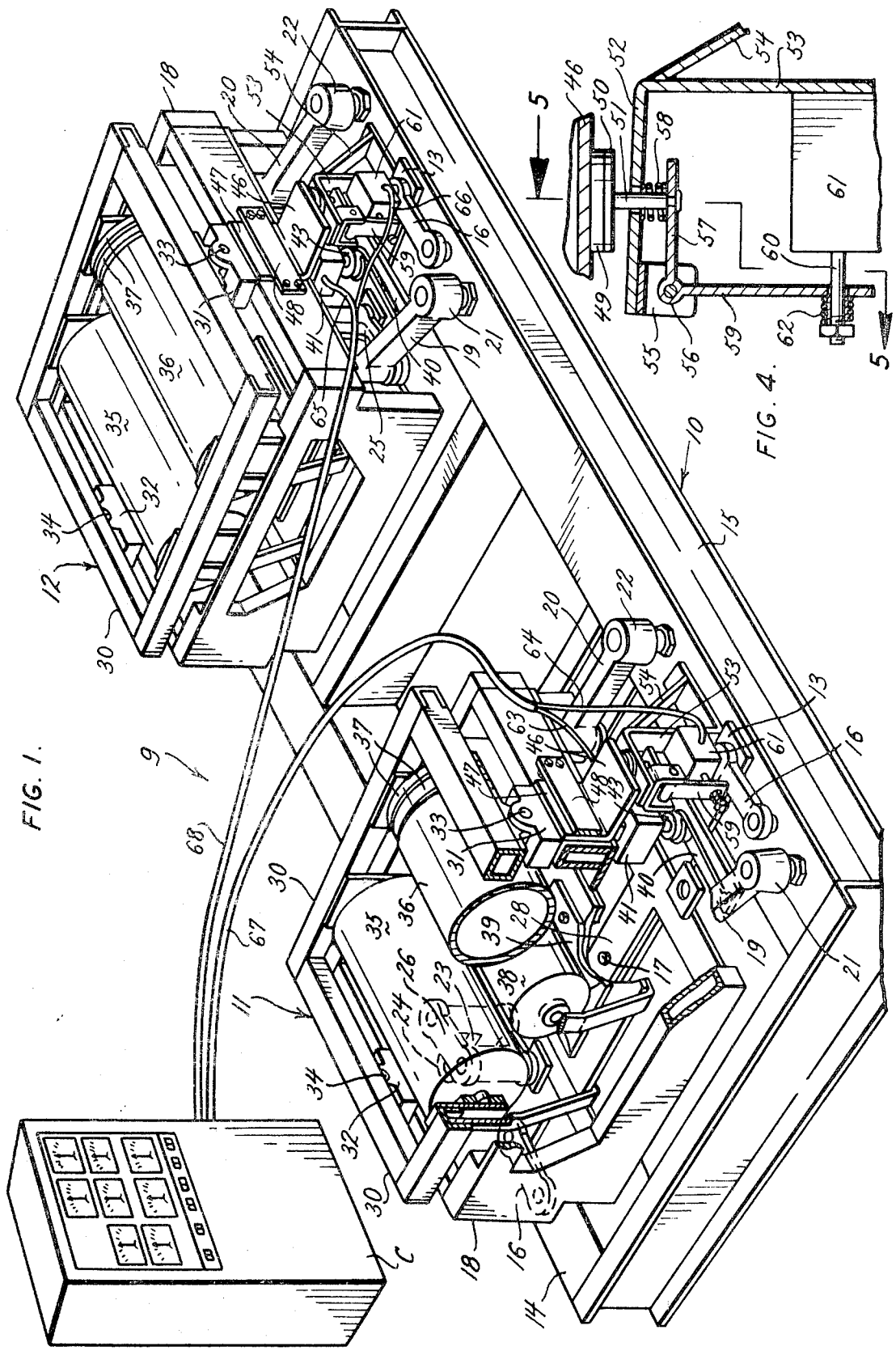
FIG. 1 is a schematic perspective view, partly broken away, of dynamic vehicle wheel alignment apparatus in which the present improvement is incorporated.

In FIG. 1 the dynamic wheel alignment apparatus 9 is adapted to rotate the left and right wheels of a vehicle (not shown). The apparatus may be disposed in a floor pit so that only the top surfaces of the rollers are at the floor level. Also there is usually provided a cabinet or console C on the floor adjacent the apparatus.

The essentials of apparatus 9 comprise a suitable frame structure 10 having an open central area in which can be located a left wheel supporting and rotating assembly 11 and a right wheel supporting and rotating assembly 12. Since these assemblies 11 and 12 are so closely similar the same reference characters will be used in both assemblies wherever possible. The assemblies have a usual or normal starting position in which each is level with the shop floor and in a straight ahead and rectilinear position to receive the vehicle. Reference, however, will be directed mostly to the left assembly 11.

The frame 10 carries a motion control bar or position reference member 13 mounted between the front lengthwise beam 14 and the rear beam 15. The respective end portions of bar 13 are pivotally connected to radius links 16 so that the bar is confined to longitudinal movement with some lateral displacement. A center pivot pin 17 is fixed in the upper surface of the control bar.

A carrier cradle 18 is operably mounted on the frame 10 by a pair of articulated arms 19 and 20 which have outer ends pivotally connected at bearings 21 and 22 respectively to the longitudinal beam member 15. The front portion of the cradle 18 is connected by a single articulated arm 23 to a bearing 24 in the longitudinal beam member 14. The arm 19 has its inner end connected by a link 25 (right side assembly in FIG. 1) to the cradle 18 and the arm 20 is similarly connected by a link 25A (FIG. 2) to the cradle 18. In like manner the single arm 23 is connected by link 26 to the cradle 18. This manner of mounting the carrier cradle 18 on the frame 10 allows the cradle to have a wide range of motion in the plane of the frame opening for following the toe-in and toe-out motions of vehicle wheels. However, the cradle 18 is provided with a bottom member 28 having a hole which receives the center pin 17 of the position reference member 13, and this connection limits the cradle motion to movement fore and aft and rotary or pivoting action with the pin 17 as its center.

A wheel supporting cradle 30 is disposed within each cradle 18. Bearings 31 and 32 on the cradles 18 receive pivot pins 33 and 34 respectively, and the pins 33 and 34 are connected to the cradles 30. In this manner the cradles 30 are permitted to tilt about the axes extending between pins 33 and 34, and each such axis intersects the axis of pin 17 when projected vertically upwardly.

Each wheel supporting cradle 30 operatively carries a pair of wheel engaging rollers 35 and 36 which can shift axially relative to each other, as set forth in the said Merrill U.S. Pat. No. 3,187,440 and for the purposes therein set forth. One of the rollers, as roller 36, is driven by belts 37 from an electric motor 38 mounted in the bottom shelf 39 of the cradle 30. The roller 35 is free to rotate in response to wheel rotation.

Figure 6:
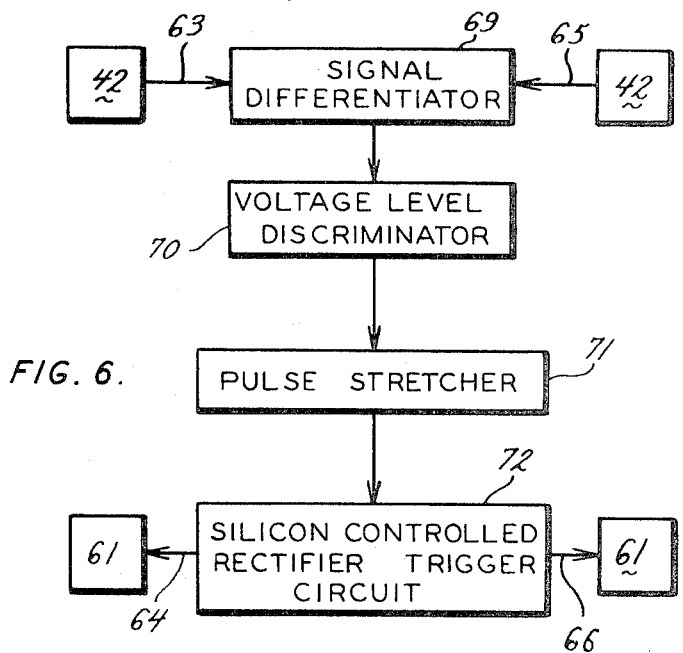
FIG. 6 is a schematic layout of the electrical system applicable to this invention.

In each assembly 11 and 12, the position reference member 13 is provided with a cross arm 40 adjacent the ends carried by the longitudinal beam member 15. Above the cross arm location the cradle 18 carries a housing 41 in which is disposed a motion sensor in the form of a potentiometer 42 (FIG. 6). The brush or movable arm (not shown) of the potentiometer is connected to a depending pulley 43 on the pivot shaft of such arm, and a suitable cable 44 (FIG. 2) is wrapped about the pulley and its opposite ends are anchored at 45 on the extremities of the cross arm 40. As a result of this, the motion of the cradle 18 is sensed by the pulley rotation and the potentiometer brush or arm is displaced in accordance with such motion. It is especially important to note that the rapidity of motion of the cradle 18 is sensed, as well as the extent of the movement.

Figure 3:
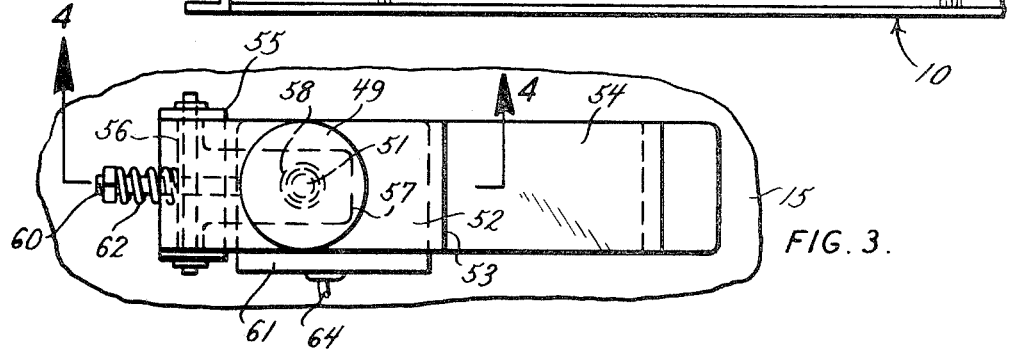
FIG. 3 is a plan view of the brake means of this invention, the same being taken at line 3–3 in FIG. 2.
Figure 5:
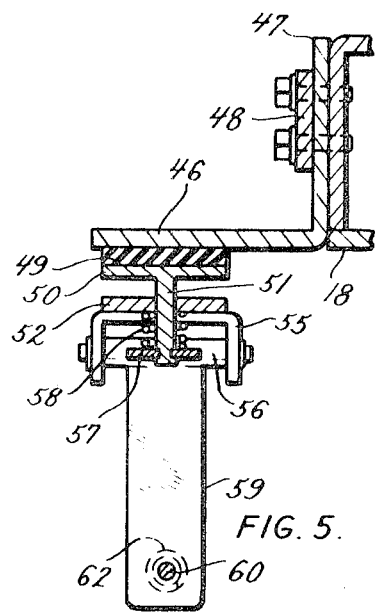
FIG. 5 is a detailed view taken at line 5–5 in FIG. 4.

The carrier cradles 18 each support a brake plate 46 which has (FIG. 5) its leg 47 clamped by suitable bar means 48 to the frame of cradle 18. The plate 46 projects outwardly over the frame member 15 (FIG. 1) so it can be engaged by a brake pad 49 (FIGS. 3, 4 and 5). The pad 49 is carried by a movable shoe 50 operably mounted by its stem 51 in the horizontal portion 52 of a bracket 53 fixed to the member 15 and stiffened by a brace 54. The portion 52 of the bracket supports a pivot clevis 55 for the knuckle 56 of a bellcrank whose horizontal arm 57 is secured to the lower end of the stem 51 of the brakeshoe 50. A retract spring 58 holds the shoe 50 and its pad 49 out of engagement with the brake surface 46. The vertical arm 59 of the bellcrank is engaged by the rod 60 on the armature (not shown) of a solenoid actuator 61. The actuator 61 is mounted on the bracket 53 so that the rod 60 moves in a horizontal direction and acts to pull the bellcrank arm 59 in a counterclockwise direction when the solenoid is energized. A spring 62 cushions the braking action. When the solenoid is deenergized, the return spring 58 restores the brake mechanism to the "off" position where the pad 49 is free of the brake plate 46.

Figure 2:
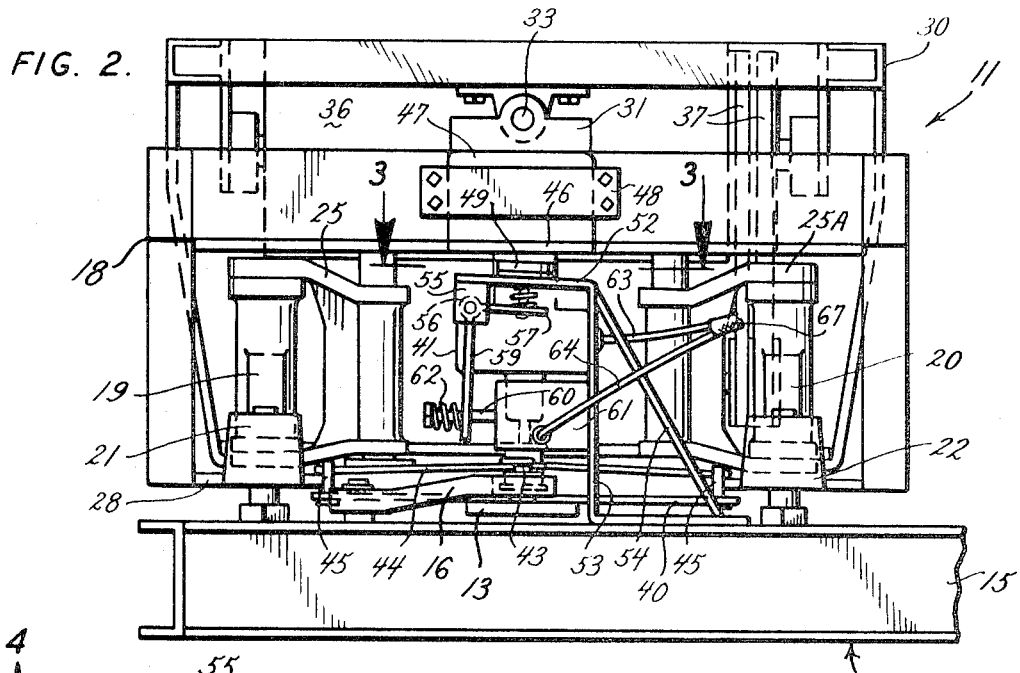
FIG. 2 is a fragmentary elevational view of the left wheel rotating assembly in FIG. 1.

It is, of course, understood that the left assembly 11 and the right assembly 12 each have a brake device of the character above described. It is also understood that the motion of each cradle 18 is sensed by a potentiometer 42 (FIG. 6) mounted in housing 41 (FIGS. 1 and 2). The left-hand potentiometer 42 is connected into the cabinet C by cable 63 and an output signal is transmitted from the cabinet by cable 64 connected into the solenoid actuator 61. The right-hand potentiometer 42 is similarly connected by a cable 65 and the output signal reaches the actuator 61 by cable 66. Cables 63 and 64 may be combined in a common lead 67, and cables 65 and 66 may be combined in a common lead 68.

In FIG. 6, there is shown a schematic layout of the electrical system suitably mounted in the cabinet C and conditioned to receive the motion signals from either potentiometer 42 at the assemblies 11 and 12 and convert the same into a command signal transmitted to the solenoids in housings 61 for applying the brake pads 49 to the brake plates 46. The command signal is sent out in the event the cradles 18 become unstable or violent in motion when the vehicle wheels are being rotated by the rollers 35 and 36.

The potentiometers 42 provide a voltage level signal which is representative of the physical position of the cradles 18. The signals are conducted by cables 63 and 65 to a signal differentiator 69 which produces a voltage level signal that is proportional to the relative rate of change of the incoming signal from the potentiometers 42. The signal is, therefore, proportional to the relative velocity of the motion or change of position of cradles 18. The signal from differentiator 69 is fed to a voltage level discriminator 70 which, when activated by a predetermined voltage level signal from the differentiator 69, sends a "start" signal to a pulse stretcher 71. The pulse stretcher 71 then initiates a "run" signal which is received by the silicon controlled rectifier trigger circuit 72. The "run" signal will continue for a suitable time predetermined by the circuit elements of the pulse stretcher 71. During the time the "run" signal is presented to the trigger circuit 72, the rectifiers 72 allow current to flow in the solenoids 61 through cables 64 and 66. The solenoids 61 provide the necessary braking influence on the cradles 18 to bring the apparatus into stable operation.

We claim:

1. Control means to stabilize dynamic vehicle wheel testing apparatus comprising, in combination with a pair of wheel supporting and rotating assemblies operably mounted for angular change of position in a common plane relative to each other and to a normal starting position: a position reference member for each assembly normally set for a predetermined relative normal starting position of said assemblies; position sensing means carried by each assembly and operably connected to a position reference member, said position sensing means each generating an electrical signal having a voltage value proportional to the change of angular position of its respective assembly relative to said normal starting position; position stabilizing means operably connected to each assembly to restrain each assembly when its change of position exceeds a predetermined rate of change; and common signal analyzing and triggering circuit means connected between each of said position sensing means and said position stabilizing means, said circuit means measuring and comparing the signal voltage from each sensing means and responding to signal voltage which exceeds a predetermined minimum value proportional to the rate of change of the relative angular position of said pair of assemblies to actuate said position stabilizing means and check the change of position of said assemblies.

2. The control means of claim 1 wherein said signal analyzing and triggering circuit means includes signal differentiator means activated by signals from said motion sensing means, means to discriminate between voltage levels above and below a predetermined voltage level, and other means to release a signal to said motion stabilizing means.

3. In dynamic vehicle wheel alignment testing apparatus having a pair of wheel supporting and rotating assembly movable in a common plane and having a normal rectilinear vehicle receiving position, the improvement comprising: brake means engageable with each said assembly to arrest motion of each said assembly; and electrically responsive means responsive to the movement of said wheel supporting and rotating assemblies out of said normal rectilinear vehicle receiving positions and connected to said brake means for actuating the latter means in response to an electrical signal that is proportional to a predetermined rate of change of the positions of said assemblies, said electrically responsive means including signal generating means carried by each said wheel supporting and rotating assemblies.

4. The improvement of claim 3 wherein said electrically responsive means includes a potentiometer carried by said assembly and movable therewith to generate a voltage level signal indicative of the position of said assemblies.

5. The improvement of claim 3 wherein said electrically responsive means includes signal differentiator means, means to time the duration of the signal and a trigger circuit connected between said differentiator means and said brake means.

6. Control means for dynamic wheel alignment apparatus comprising, in combination with a pair of independently mounted wheel supporting and rotating assemblies having freedom to move angularly together and relative to each other from starting positions in a substantially common plane of reference: a position reference member in each assembly; position sensing means operably connected to each reference member to generate an electrical signal having a voltage value proportional to the position of said assemblies; electrical signal analyzing circuit means connected to both said position sensing means and operative to differentiate each signal and compare the analyzed voltage value with a predetermined reference voltage value; triggering circuit means connected to said signal analyzing circuit means and operative to transmit a flow of current when said predetermined reference voltage value is exceeded; and stabilizing means operably connected to each said assembly and to said triggering circuit means to respond to said current flow and apply a stabilizing force on each said assembly to restrain its freedom of angular motion.

7. The control means set forth in claim 6 wherein said position sensing means in each assembly moves with assembly movement relative to said position reference member for each respective assembly, said movement of said position sensing means being at times in the same direction and at other times in opposite directions in response to the independent freedom of movement of said assemblies relative to said common plane of reference.

8. The control means set forth in claim 7 wherein said signal analyzing circuit means includes a signal differentiator and voltage level discriminator.

9. The control means set forth in claim 7 wherein said signal analyzing circuit means includes a signal differentiator, voltage level discriminator and a signal pulse stretcher to initiate a run signal having a predetermined time duration, and said run signal is passed to said triggering circuit means to initiate said current flow to said stabilizing means.